UNITED STATES PATENT OFFICE.

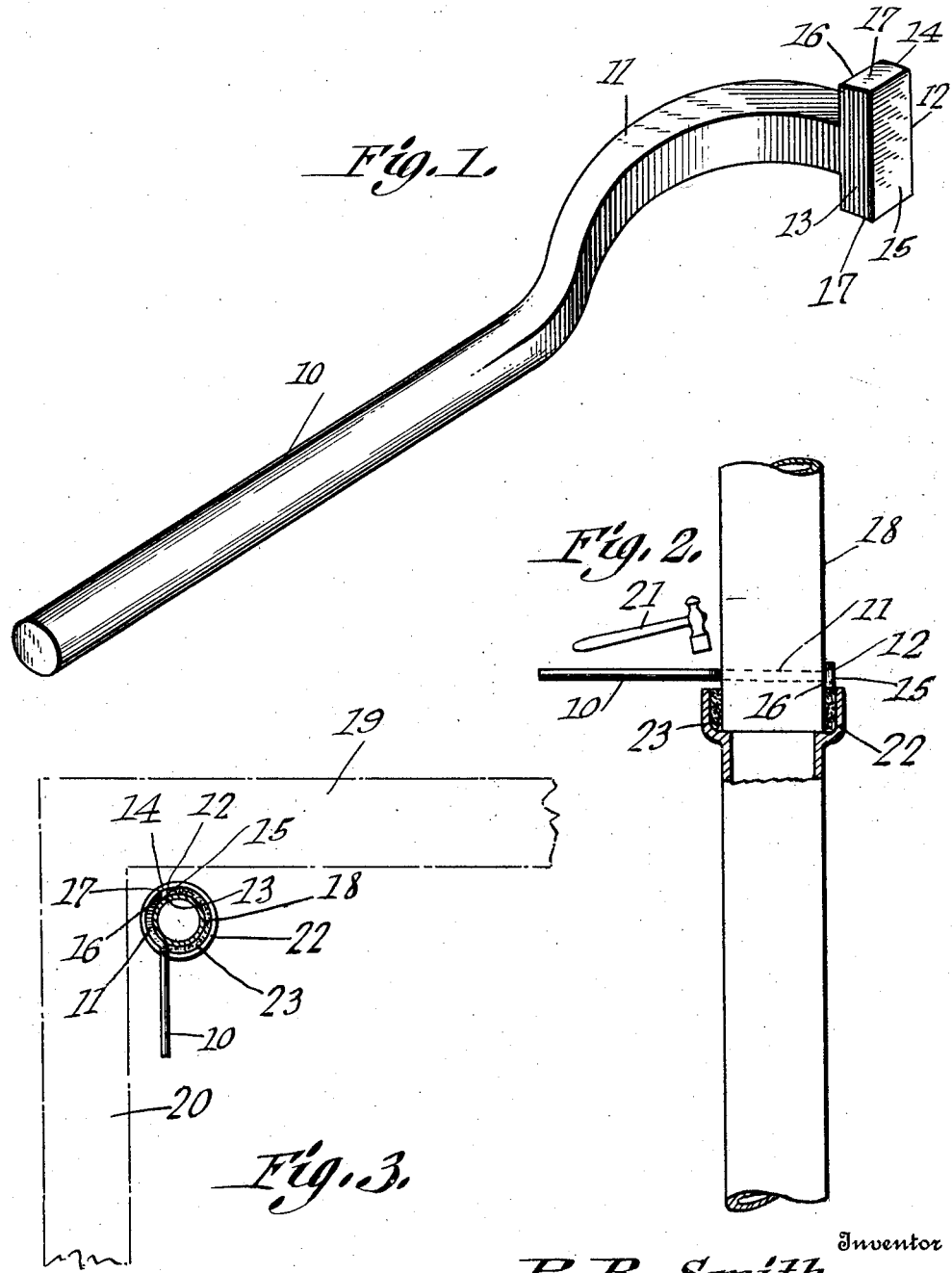

PETER ROY SMITH, OF AKRON, OHIO.

CALKING DEVICE.

1,333,286.  Specification of Letters Patent.  Patented Mar. 9, 1920.

Application filed November 24, 1919. Serial No. 340,426.

*To all whom it may concern:*

Be it known that I, PETER ROY SMITH, a citizen of the United States, residing at Akron, in the county of Summit and State of Ohio, have invented a new and useful Calking Device, of which the following is a specification.

The present invention relates to a calking device, calking iron or recess iron particularly adapted for use by plumbers in calking or packing joints of pipes and particularly soil pipes where the pipe is run in a corner or cramped space, and wherein a portion of the joint is inaccessible for calking under ordinary circumstances or with an ordinary calking iron or tool.

The object of the invention is to provide a simple, strong and durable device capable of being economically manufactured and which will reliably serve the purpose of calking joints in soil pipes or the like, where it is not possible to use the common calking iron, or where the joint is so positioned as not to permit access by the arms or hands of the plumber together with the ordinary calking tool and hammer.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a perspective view of the improved calking device;

Fig. 2 is a vertical sectional view of the pipe showing the use of the device; and Fig. 3 is a horizontal sectional view.

As shown in the drawings, in which like reference characters designate corresponding parts throughout the several views, my improved calking iron includes a handle or shank 10 of the proper metal, preferably steel, said shank being relatively straight and preferably substantially circular in cross section, while one portion thereof is formed with an outwardly curved end 11 which is curved in alinement and slightly beyond the shank 10 so as to constitute an arcuate portion for rendering the same capable of being fitted around a pipe. The free end of the device is formed with a vertical portion or calk 12, which projects upwardly and downwardly from the curved portion of the shank, and has its inner and outer faces 13 and 14 extending contiguous with the curvature of the portion 11 but slightly tapering from the side 16 to the side 15, the face 13 being beveled at the inside of the tool. The opposed sides 15 and 16 are parallel and extend substantially in parallel relation to the direction of the extent of the handle, which latter may be constructed in any desired manner. The calk portion is preferably slightly offset from the shank portion of the handle of the tool, and the ends 17 of the calk or vertical projection 12, are disposed horizontally in parallel relation and parallel to the top and bottom faces of the outwardly curved portion 11 of the shank of the tool, so as to constitute the proper tamping surface, said ends 17 being substantially diamond-shaped in plan, as clearly shown in the drawings.

In the use of the device, as in connection with soil pipes 18 which are disposed at the meeting corners of the walls 19 and 20 of a building or the like, the curved portion of the tool may be fitted around the pipe in the manner indicated in the Figs. 2 and 3 of the drawings and by inserting the calk in the joint, the joint may be properly packed by striking a blow of the hammer indicated at 21, against the shank portion at the curve of the handle of the tool, indicated by the reference character 11.

As shown, the pipe comprises sections, the lower end of one of which is fitted in a flange 22 of the other so as to accommodate the packing 23, which may be lead or other packing material poured into the joints between the inner face of the flange and the pipe section fitting thereinto. The joint may therefore be properly packed at the confined space in the corner which would not ordinarily be accessible with the ordinary or common calking iron, since the arms cannot be readily inserted, and since the device can be reversed in position from the right side to the left side, the joints can be packed securely and tight all around thus producing a very efficient joint sealed against the escape of water.

Having thus described the invention what is claimed is:

1. A calking device comprising a handle having a curved shank portion and a lateral projection at the extremity of said curved portion, said projection having a flat face.

2. A calking arm comprising a single bar of metal forming a handle and a shank portion provided with an offset curve extending beyond the plane of the shank and provided with a projection at the end thereof having a tamping face.

3. A calking arm comprising a single bar of metal forming a handle and a shank portion provided with an offset curve extending beyond the plane of the shank and provided with oppositely extending projections having their inner and outer faces extending contiguously with the arc of the curved portion.

4. A calking arm comprising a single bar of metal forming a handle and a shank portion provided with an offset curve extending beyond the plane of the shank and provided with projections at either side thereof having their inner and outer faces extending contiguously with the arc of the curved portion, said projection being extended at right angles to the curved portion and having flat ends constituting tamping faces.

In testimony that I claim the foregoing as my own I have hereto affixed my signature in the presence of two witnesses.

PETER ROY SMITH.

Witnesses:
 SAMUEL FRIEDMAN,
 EDYTHE MAGUIRE.